US006952468B2

(12) United States Patent
Lee

(10) Patent No.: US 6,952,468 B2
(45) Date of Patent: Oct. 4, 2005

(54) METHOD FOR PROVIDING CALL-CONNECTED PARTY'S INFORMATION IN PRIVATE EXCHANGE NETWORK

(75) Inventor: Sang-Hee Lee, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 280 days.

(21) Appl. No.: 10/350,015

(22) Filed: Jan. 24, 2003

(65) Prior Publication Data

US 2003/0156694 A1 Aug. 21, 2003

(30) Foreign Application Priority Data

Feb. 18, 2002 (KR) .......................................... 2002-8567

(51) Int. Cl.[7] ........................ H04M 1/56; H04M 15/06; H04M 1/00

(52) U.S. Cl. ............................ 379/142.12; 379/142.06; 379/142.15; 379/157; 379/165

(58) Field of Search ....................... 379/142.01, 142.06, 379/142.12, 142.15, 142.17, 156, 164, 165, 157

(56) References Cited

U.S. PATENT DOCUMENTS 5,642,410 A * 6/1997 Walsh et al. ........... 379/201.04
5,655,014 A * 8/1997 Walsh et al. ................ 379/242
5,655,015 A * 8/1997 Walsh et al. ........... 379/201.04
5,848,131 A * 12/1998 Shaffer et al. ............. 379/88.2
5,870,464 A * 2/1999 Brewster et al. ............ 379/219
6,047,054 A * 4/2000 Bayless et al. ........ 379/202.01
6,208,721 B1 3/2001 Feinberg et al. ............ 379/134
6,263,072 B1 * 7/2001 Booton et al. ......... 379/373.05
6,324,263 B1 11/2001 Sherwood et al. ....... 379/88.19
6,337,857 B1 * 1/2002 Booton ....................... 370/352
6,339,593 B1 1/2002 Kikinis ....................... 370/352
6,456,615 B1 9/2002 Kikinis ....................... 370/352
6,700,964 B2 * 3/2004 Schmid et al. .............. 379/189
6,807,264 B1 * 10/2004 Booton .................. 379/201.04
2001/0040942 A1 11/2001 Glowny et al. .......... 379/88.22

* cited by examiner

*Primary Examiner*—Binh K. Tieu
(74) *Attorney, Agent, or Firm*—Robert E. Bushnell, Esq.

(57) ABSTRACT

A method provides a call-connected party's information to a terminal in a private exchange network. The method displays the call-connected party's information in a private exchange network, and provides accurate information of a call originator to a terminal of a call receiver. The private exchange system is connected to a CTI (Computer Telephony Integration) server having a database including a phone number and various information corresponding to the phone number, and includes at least one terminal being a slave terminal for receiving/displaying information of the database. A method for providing a call-connected party's information in a private network using the private exchange system includes: a) if there is an information retrieval request for a certain phone number in the private exchange system, generating an information retrieval request message having the requested phone number in the private exchange system, and allowing the private exchange system to transmit the information retrieval request message to the CTI server; b) upon receiving the information retrieval request message from the private exchange system, checking whether there is a database matched with the phone number contained in the information retrieval request message in the CTI server, generating a database checking result message, and transmitting the database checking result message to the private exchange system; and c) upon receiving information matched with the phone number from the CTI server, allowing the private exchange system to transmit the information to a corresponding terminal.

21 Claims, 2 Drawing Sheets

METHOD FOR PROVIDING CALL-CONNECTED PARTY'S INFORMATION IN PRIVATE EXCHANGE NETWORK

CLAIM OF PRIORITY

This application makes reference to, incorporates the same herein, and claims all benefits accruing under 35 U.S.C. §119 from an application for METHOD FOR DISPLAYING THE OTHER PART INFORMATION IN PRIVATE EXCHANGE NETWORK earlier filed in the Korean Industrial Property Office on 18 Feb. 2002 and there duly assigned Ser. No. 2002-8567.

BACKGROUND OF THE INVENTION

1. Field of the Invention

The present invention relates to a method for providing a terminal with information in a private exchange network, and more particularly to a method for providing call-connected party's information to a terminal in a private exchange network, and displaying the information on the terminal.

2. Description of the Related Art

Typically, exchange systems are able to check the information of a call originator, because the call originator's information is capable of being previously transmitted between exchange systems in compliance with a R2 protocol or a No. 7 signaling scheme. However, up until recently, it was actually impossible to provide a terminal with the call originator's information because providing the terminal with the call originator's information was restricted legally, so that it was also impossible for the terminal to display the call originator's information thereon. However, in recent times, the regulations restricting the provision of the call originator's information to the terminal has been abolished, so that new technology for informing a terminal of the call originator's information in an exchange system is now increasingly developed. The call originator's information provided from the exchange system is a phone number of a call originator. The technology for providing a terminal with a call originator's phone number was first applied to a mobile communication field. Presently, it is necessary for a wired terminal to receive the call originator's information. So, there have been proposed various kinds of technology for providing the call originator's information to a digital telephone displaying the information thereon.

In the meantime, in case of a private network, there has been proposed CTI (Computer Telephony Integration) technology for providing a variety of services by interconnecting a plurality of computers in connection with a private exchange system. The CTI technology allows a plurality of users to receive more services by adding a computer function to a telephone service.

Also, wired terminals are classified into terminals using a central office network (also called an office network) connected to a telephone switching station and other terminals using a private network used for a specific purpose. Typically, the terminals using the private network use a private exchange system to process a call within the private network, and are linked with an office network. The exchange systems of the office network transmit call origination information (e.g., the call originator's information) to an exchange system of the private network. That is, the private exchange system contained in such private network receives a phone number of the call originator from an office network. Therefore, in the case where even wired subscribers use a digital telephone able to display information thereon in the private network, the call originator's phone number can be provided to the digital telephone in the private network.

However, in the case of only using the call originator's phone number as described above, a call receiver (i.e., a call terminator) cannot immediately recognize a call originator under the condition that the call receiver is not aware of all phone numbers. In other words, the call receiver has to check a phone number displayed on the digital telephone, and then has to remember a call originator corresponding to a phone number. Since these procedures are very inconvenient for the call receiver, the call receiver cannot recognize accurate information of a call originator on the basis of only a call originator's phone number. Also, a private network is generally used for a local area such as an office, so that internal calls (i.e., calls via an extension line) are frequently generated. In this case, if an exchange system provides only the call originator's phone number to a terminal of a call receiver and displays it on the terminal, the call receiver has almost no information of the call originator because of the difficulty of discriminating between phone numbers. As a result, subscribers of a private network desire to more accurately recognize the information of a call-connected party.

SUMMARY OF THE INVENTION

Therefore, the present invention has been made in view of the above and other problems, and it is an object of the present invention to provide a method for providing accurate information of a call originator to a terminal of a call receiver in a private exchange network.

It is another object of the present invention to provide a method for providing accurate information of a call originator by adopting CTI (Computer Telephony Integration) technology in a private exchange network.

It is an object of the present invention to provide an efficient and economic technique for providing accurate information of a call originator to a terminal of a call receiver in a private exchange network.

In accordance with the present invention, the above and other objects can be accomplished by the provision of a method for providing call-connected party's information in a private network using a private exchange system which is connected to a CTI (Computer Telephony Integration) server having a database composed of a phone number and various information corresponding to the phone number, and includes at least one terminal being a slave terminal for receiving/displaying information of the database, including the steps of: a) if there is an information retrieval request for a certain phone number in the private exchange system, generating an information retrieval request message having the requested phone number in the private exchange system, and allowing the private exchange system to transmit the information retrieval request message to the CTI server; b) upon receiving the information retrieval request message from the private exchange system, checking whether there is a database matched with the phone number contained in the information retrieval request message in the CTI server, generating a database checking result message, and transmitting the database checking result message to the private exchange system; and c) upon receiving information matched with the phone number from the CTI server, allowing the private exchange system to transmit the information to a corresponding terminal.

Preferably, the private exchange system may determine whether a corresponding terminal is an information offerable terminal in case of a call termination or a call origination, may perform an information display function if the terminal is the information offerable terminal, and may perform a general call control if a call-connected terminal cannot display caller information thereon.

Preferably, the CTI server may transmit all information pre-stored to be matched with a phone number to the private exchange system, if the phone number is contained in the received information retrieval request message upon receiving the database checking result message.

Preferably, the CTI server may inform the private exchange system of no information message corresponding to a phone number if there is no ID (Identification) information identical with the phone number upon receiving the database checking result message, and the private exchange system may perform a general call control upon receiving the no information message from the CTI server.

Preferably, the private exchange system may transmit the information retrieval request message to the CTI server if a call is terminated at the information offerable terminal, and at the same time may transmit a ring signal to the corresponding terminal. Otherwise, upon receiving the caller information message, the private exchange system transmits a ring signal along with the caller information to the call-connected terminal.

Preferably, the private exchange system may transmit the information retrieval request message to the CTI server in case of a call origination, and at the same time may perform a call origination operation to a PSTN (Public Switched Telephone Network).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
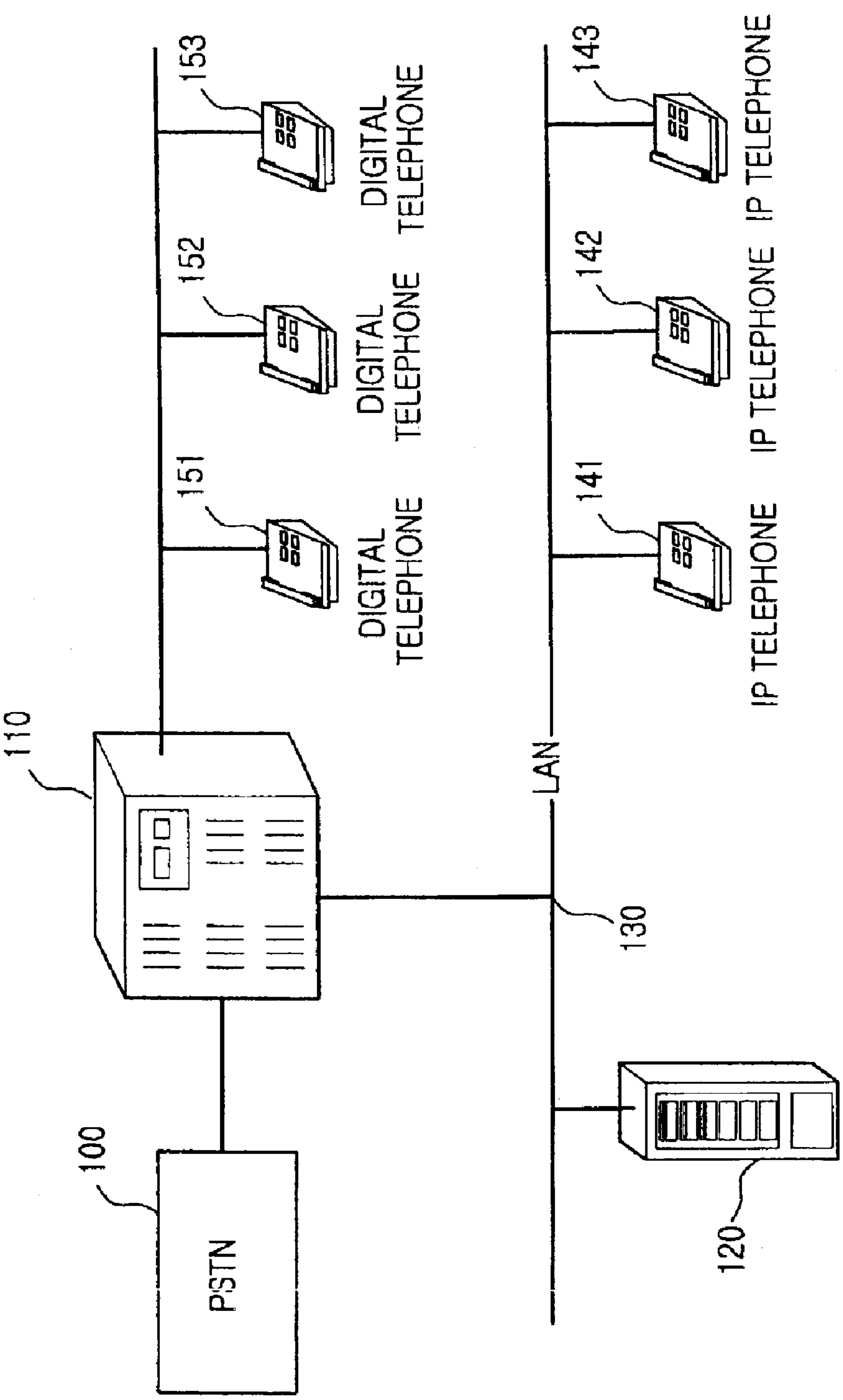
FIG. 1 is a view illustrating a private network based on CTI technology in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a view illustrating a private network based on CTI technology in accordance with a preferred embodiment of the present invention. A configuration of a private network based on CTI technology and its operation in accordance with the present invention will hereinafter be described with reference to FIG. 1.

Referring to FIG. 1, a private exchange system 110 is connected to a PSTN (Public Switched Telephone Network) 100, and performs an outgoing call process for generating a call and an incoming call process for receiving the call from the PSTN 100. The private exchange system 110 transmits a caller ID received with a call termination signal when terminating the incoming call to a CTI server 120 over a LAN (Local Area Network) 130, and then retrieves information of the caller. If the private exchange system 110 receives the call originator information from the CTI server 120, the private exchange system 110 transfers the call originator information to a corresponding terminal.

The private exchange system 110 includes a plurality of extension subscribers. The extension subscribers include a plurality of digital telephone subscribers 151, 152 and 153 for transmitting a telephone signal and data at once, a plurality of general telephone subscribers (not shown in FIG. 1), and a plurality of IP (Internet Protocol) telephones 141, 142 and 143 interconnected over the LAN 130. The digital telephone subscribers 151, 152 and 153 additionally include data lines, respectively, and receive subscriber information via the data lines. The IP telephones 141, 142 and 143 receive subscriber information along with voice signals over the LAN 130. The digital telephones 151, 152 and 153 and the IP telephones 141, 142 and 143 respectively include a display panel such as an LCD (Liquid Crystal Display) for displaying caller information thereon.

The CTI server 120 includes phone numbers and caller information corresponding to each phone number. For example, the CTI server 120 stores a name of a caller, an office name, a position in office, an E-mail (electronic mail) address, a Web address, a home address, and a memorandum content, etc., where they are matched with a phone number of a mobile terminal of a subscriber, an extension number, and a home phone number, etc. This can be briefly represented as a following Table 1.

TABLE 1

| | |
|---|---|
| Subscriber Name | HONG, Gil-dong |
| Mobile Terminal's Phone Number | 011-111-1111 |
| Extension Phone Number | 1111 |
| Home Phone Number | 01-111-1111 |
| Company | Doccabee Co., Ltd. |
| Title | Section Chief |
| E-mail Address | honggildong@do.co.kr |
| Web Address | http://www.do.co.kr |
| Caller Home Address | Doccabee building, **street, **dong, Jongro-goo, Seoul |
| Memorandum | Friend |

The table 1 exemplarily depicts a plurality of storage fields assigned to a single subscriber. The CTI server 120 stores the information having the above fields. Such information will hereinafter be called caller information. Also, a caller ID to be mentioned in the following description indicates a phone number (e.g., a mobile terminal's phone number, an extension number, and a home phone number, etc.) of a caller.

If the private exchange system 110 receives a caller ID, then the private exchange system 110 transmits the caller ID to the CTI server 120 over a LAN 130. Then, the CTI server 120 checks a phone number field of a database having the above fields, and determines if there is phone number information corresponding to the caller ID in the database. If there is phone number information corresponding to the caller ID in the database, the CTI server 120 generates the phone number information as caller information, and then transmits it to a private exchange system 110 over a LAN 130. At this time, the information transmitted to the private exchange system 110 can be constructed as shown in the above Table 1. Therefore, in the case where the private exchange system 110 receives the caller information as shown in the Table 1 from the CTI server 120, it transmits the caller information to a corresponding reception terminal.

Figure 2:
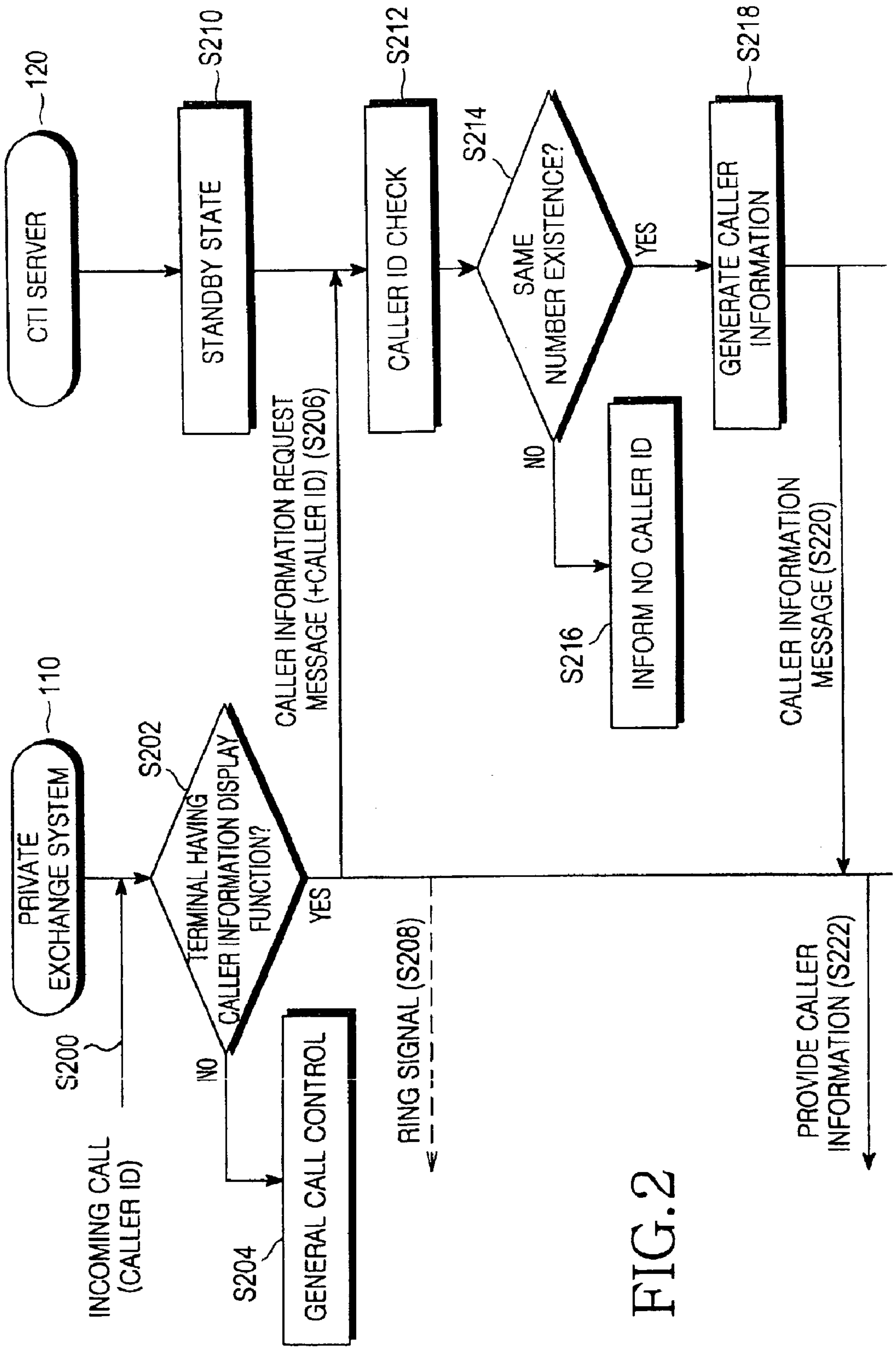
FIG. 2 is a flow chart illustrating a procedure for transferring information of a call originator to a terminal of a call receiver in a private network in accordance with a preferred embodiment of the present invention.

FIG. 2 is a flow chart illustrating a procedure for transferring information of a call originator (i.e., caller) to a terminal of a call receiver in a private network in accordance with a preferred embodiment of the present invention. A procedure for transferring caller information to a reception terminal and a signal flow accompanied with the procedure will hereinafter be described with reference to FIG. 2.

If a call termination is made with a caller ID at step S200, then the private exchange system 110 determines at step S202 if a call-connected subscriber requested by a caller has a terminal capable of displaying caller information thereon. If it is determined at step S202 that the terminal of the call-connected subscriber cannot display caller information thereon, then the private exchange system 110 goes to a step S204 to perform a general call control. Such general call control made in the step S204 generates an incoming call sound, and then provides a call-connection state if a call-connected subscriber is in a hook-off state.

In the meantime, if it is determined at step S202 that the terminal of the call-connected subscriber is a terminal capable of displaying caller information thereon, the private exchange system 110 goes to a step S206 to transmit a caller information request message to a CTI server 120. The reason why the message for the CTI server 120 is called a caller information request message is that the message retrieves caller information in an incoming call condition. Therefore, even in another case to be described later, the private exchange system 110 can request the stored information from the CTI server 120 by employing the same format information as the caller information request message. So, in the case where a message transmitted from the private exchange system 110 to the CTI server 120 has a phone number field and information existence is determined upon receiving a retrieve result signal of the phone number field, the message having the phone number field is to be a message further having a request field for requesting the existing information. Accordingly, the message having the two fields (i.e., the phone number field and the request field) will hereinafter be indicated as an information retrieval request message.

Simultaneously with the step S206, the private exchange system 110 sends out a ring signal to a corresponding subscriber terminal at step S208. In this case, the CTI server 120 maintains a standby state at step S210. But, even when the CTI server 120 is not in a standby state at step S210, there is no problem in the present invention's implementation.

The CTI server 120 goes to step S212 upon receiving a caller information request message, and checks a caller information database having the fields shown in the Table 1 at step S212. In the case of checking the caller information database at step S212, the CTI server 120 checks all information registered in terms of a phone number, that is, a mobile terminal number of a subscriber, a home phone number, and an extension number, etc. Then, the CTI server 120 goes to step S214, and determines at step S214 whether there is a phone number identical with the received caller ID. If the same phone number as the received caller ID is detected at step S214, then the CTI server 120 goes to step S218. If the same phone number as the received caller ID is not detected at step S214, then the CTI server 120 goes to step S216 and transmits a signal indicating no caller ID state to the private exchange system 110 at step S216. Likewise, if the CTI server 120 informs the private exchange system of the no caller ID state at step S216, then the private exchange system performs a general call control as in the step S204.

However, if the same phone number as the received caller ID is detected at step S214, the CTI server 120 generates a caller information message composed of all the information of such fields stored as in the Table 1. The CTI server 120 transmits the generated caller information message to the private exchange system 110 at step S220.

Upon receiving the caller information message, the private exchange system 110 provides caller information to a called terminal receiving the ring signal (step S222). Accordingly, the private exchange system 110 transmits the caller information to the digital telephones 151, 152 and 153 and the IP telephones 141, 142 and 143 shown in FIG. 1. As a result, one called terminal of the digital telephones 151, 152 and 153 and the IP telephones 141, 142 and 143 displays the received caller information on a display. Herein, in the case of the digital telephones 151, 152 and 153, the caller information transmitted from the private exchange system 110 to a call termination subscriber is transferred via an additional line for data transmission, instead of a voice communication line. In case of the IP telephones 141, 142 and 143, the caller information is composed of predetermined packets, and is then transferred to the call termination subscriber either in conjunction with a control message or separately from the control message.

As can be seen from FIG. 2, after the private exchange system 110 determines at step S202 whether a terminal of a call-connected subscriber is able to display caller information thereon, the next steps are performed on the basis of the determination result. But, it is also impossible to remove the step S202 from an overall step shown in FIG. 2. The private exchange system 110 transmits a ring signal to a called terminal simultaneously with transmitting the caller information request message to the called terminal, and then provides the terminal with the received caller information. But, if the private exchange system receives the caller information, then it can transmit a ring signal along with the caller information to the called terminal.

When a caller information database is stored in the CTI server 120, another computer can remotely input contents of the caller information database into the CTI server 120 under the condition that the CTI server is connected to a LAN 130. That is, each reception terminal can construct a desired caller information database.

Although FIG. 2 illustrates operations of the private exchange system and the CTI server 120 by way of an example of a call termination, the present invention is not limited to this scope, but performs the aforesaid operations in a variety of cases. For example, even in the case where the digital telephones 151, 152 and 153 or the IP telephones 141, 142 and 143 connected to the private exchange system 110 request an outgoing call, it is possible to perform the aforesaid operations. In the case where there is a call origination request signal instead of a call termination signal at the above step S202, the next steps can be performed in the same manner. But, a message transmitted from the private exchange system 110 to the CTI server 120 at step S206 requires information of a dialed phone number instead of a caller information request message. Namely, the dialed phone number is added to the information retrieval request message. Therefore, if there is retrieval result information in the CTI server 120, the information is transferred to the private exchange system 110. Further, the private exchange system 110 transfers the information to a terminal generating an outgoing call. At this time, if the private exchange system waits for a dialing to a PSTN and receives information corresponding to a dialed terminal from the CTI server 120, it can send a dialing signal to the PSTN simultaneously with providing the information to a call origination terminal. On the contrary, in the case where the private exchange system 110 firstly transmits a dialing signal to the PSTN and then receives information corresponding to a dialed terminal from the CTI server 120, it can provide a call origination terminal with the received information. In other words, it is possible for the private exchange system 110 to transmit a dialing signal when transferring information to a call origination terminal, and is also possible for the private exchange system 110 to provide the call origination terminal with the information after transferring the dialing signal.

Further, even in a call connection state or otherwise, if there are information retrieval request signals from the digital telephones 151, 152 and 153 or the IP telephones 142, 142 and 143, the private exchange system 110 can perform appropriate operations for the retrieved information. A description of this operation will hereinafter be described below.

If a private exchange system 110 receives an information retrieval request signal from the digital telephones 151, 152 and 153 or the IP telephones 142, 142 and 143 functioning as slave units at step S200, it goes to step S206 without passing step S202, generates an information retrieval request message (or signal) at step S206, and transmits it to a CTI server 120. The reason why the step S202 is deleted is that an overall system configuration is designed to allow only the digital telephones 151, 152 and 153 or the IP telephones 141, 142 and 143 to transmit the information retrieval request signal. But, if a general telephone is designed to transmit such information retrieval request signal, the private exchange system 110 performs the step S202. In the case where the information retrieval request signal is received from the general telephone, the private exchange system 110 deletes the step S202.

If such message is transmitted from the private exchange system 110 to the CTI server 120, the CTI server 120 performs the above steps S210~220. Therefore, in the case where there is corresponding information in a response message from the CTI server 120, the private exchange system 110 transmits the information to a terminal. If there is no corresponding information in the response message from the CTI server 120, the private exchange system 110 informs the terminal of no message.

As apparent from the above description, the present invention constructs a caller information database in the CTI server, and transmits the content of the caller information database to a corresponding subscriber (i.e., a call receiver) when a call termination state is provided, thereby more accurately displaying caller information on a terminal of the call receiver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a private exchange system connected to a computer telephony integration server having a database comprising of a phone number and a plurality of information corresponding to the phone number, and including at least one terminal being a slave terminal for receiving and displaying information of the database, a method for providing call-connected party's information in a private network using the private exchange system, comprising the steps of:

generating an information retrieval request message having the requested phone number in the private exchange system, and allowing the private exchange system to transmit the information retrieval request message to the computer telephony integration server when there is an information retrieval request for a certain phone number in the private exchange system;

checking whether there is a database matched with the phone number contained in the information retrieval request message in the computer telephony integration server, generating a database checking result message, and transmitting the database checking result message to the private exchange system upon receiving the information retrieval request message from the private exchange system; and allowing the private exchange system to transmit the information to a corresponding terminal upon receiving information matched with the phone number from the computer telephony integration server.

2. The method as set forth in claim 1, with the information retrieval request in the private exchange system being provided when a call termination is requested to an information offerable terminal among slave terminals connected to the private exchange system.

3. The method as set forth in claim 2, with the private exchange system transmitting the information retrieval request message to the computer telephony integration server when a call is terminated at the information offerable terminal, and at the same time transmits a ring signal to the corresponding terminal.

4. The method as set forth in claim 2, with the private exchange system automatically transmitting the information retrieval request message to the computer telephony integration server when a call is terminated at the information offerable terminal.

5. The method as set forth in claim 1, with the information retrieval request in the private exchange system being provided when a call origination is requested from an information offerable terminal among slave terminals connected to the private exchange system or even in a call connection state or otherwise, if there are information retrieval request from the digital telephones or Internet protocol telephones connected to the private exchange system.

6. The method as set forth in claim 1, with the private exchange system performing a call origination operation to a public switched telephone network when a call origination is requested from the information offerable terminal, and at the same time transmitting the information retrieval request message to the computer telephony integration server.

7. The method as set forth in claim 1, with the private exchange system performing a call origination operation to a public switched telephone network when a call origination is requested from the information offerable terminal.

8. The method as set forth in claim 1, with the computer telephony integration server transmitting detail user information pre-stored to be matched with a phone number to the private exchange system, said detail user information being contained in the database checking result message, when the phone number is contained in the received information retrieval request message upon receiving the database checking result message.

9. The method as set forth in claim 8, further comprised of:

the computer telephony integration server informing the private exchange system of no information message corresponding to a phone number, when there is no identification information identical with the phone number upon receiving the database checking result message; and the private exchange system performing a general call control upon receiving the no information message from the computer telephony integration server.

10. The method as set forth in claim 1, with the private exchange system transmitting information matched with the phone number to a corresponding terminal, and at the same time transmitting a ring signal to the corresponding terminal, wherein said information includes subscriber name, mobile terminal's phone number, extension phone number, home phone number, company data, title data, E-mail address, Web-Address, Caller Home Address and memorandum.

11. The method as set forth in claim 1, with the private exchange system transmitting the information retrieval request message to the computer telephony integration server when a call origination being requested from an information offerable terminal among slave terminals connected to the private exchange system, and at the same time performing a call origination operation to a public switched telephone network.

12. The method as set forth in claim 1, with the private exchange system transmitting the information retrieval request message to the computer telephony integration server when a call origination being requested from an information offerable terminal among slave terminals connected to the private exchange system, and performing a call origination operation to a public switched telephone network.

13. The method as set forth in claim 1, with the private exchange system transmitting the information retrieval request message to the computer telephony integration server when a call origination being requested from an information offerable terminal among slave terminals connected to the private exchange system.

14. An apparatus, comprising:

a server providing computer telephony integration, said server including a database including caller information, the caller information including a corresponding telephone number;

a private exchange system connected to said server, said private exchange system transmitting a caller information request message including a caller telephone number to said server, said server comparing the transmitted telephone number with the caller information stored in the database of said server, said server transmitting a caller information message to said private exchange system when the telephone number in the caller information relates to a telephone number in the database; and a terminal receiving and displaying the caller information, said terminal receiving the caller information when the caller information message is received by said private exchange system.

15. The apparatus of claim 14, with said server being connected to said private exchange system through a local area network.

16. The apparatus of claim 15, said private exchange system sending out a ring signal corresponding to one of the terminals when said private exchange system transmits the caller information to said server.

17. The apparatus of claim 16, further comprising of a computer accommodating of remotely inputting contents of the caller information into the database of said server when said server is connected to said local area network.

18. A method, comprising:

generating an information retrieval request message having a requested telephone number in a private exchange system, and allowing said private exchange system to transmit the information retrieval request message to a server when there is an information retrieval request for a certain telephone number in said private exchange system;

determining whether there is call information in a database corresponding with the telephone number contained in the information retrieval request message in said server, generating a database checking result message, and transmitting the database checking result message to said private exchange system upon receiving the information retrieval request message from said private exchange system; and allowing said private exchange system to transmit the information to a corresponding terminal upon receiving information corresponding with the telephone number from said server.

19. The method of claim 18, further comprising of determining a terminal being capable of displaying caller information before generating an information retrieval request message having a requested telephone number in said private exchange system, and allowing said private exchange system to transmit the information retrieval request message to said server when there is an information retrieval request for the certain telephone number in said private exchange system.

20. The method of claim 19, with the information retrieval request in said private exchange system being provided when a call termination is requested to an information offerable terminal among slave terminals connected to said private exchange system.

21. The method of claim 20, with said private exchange system transmitting the information retrieval request message to said server when a call is terminated at the information offerable terminal, and when transmitting a ring signal to the corresponding terminal.

* * * * *